Dec. 4, 1928.
E. J. MURPHY ET AL
1,694,277
MEANS FOR REPRODUCING POSITION
Filed Oct. 9, 1924
2 Sheets-Sheet 1
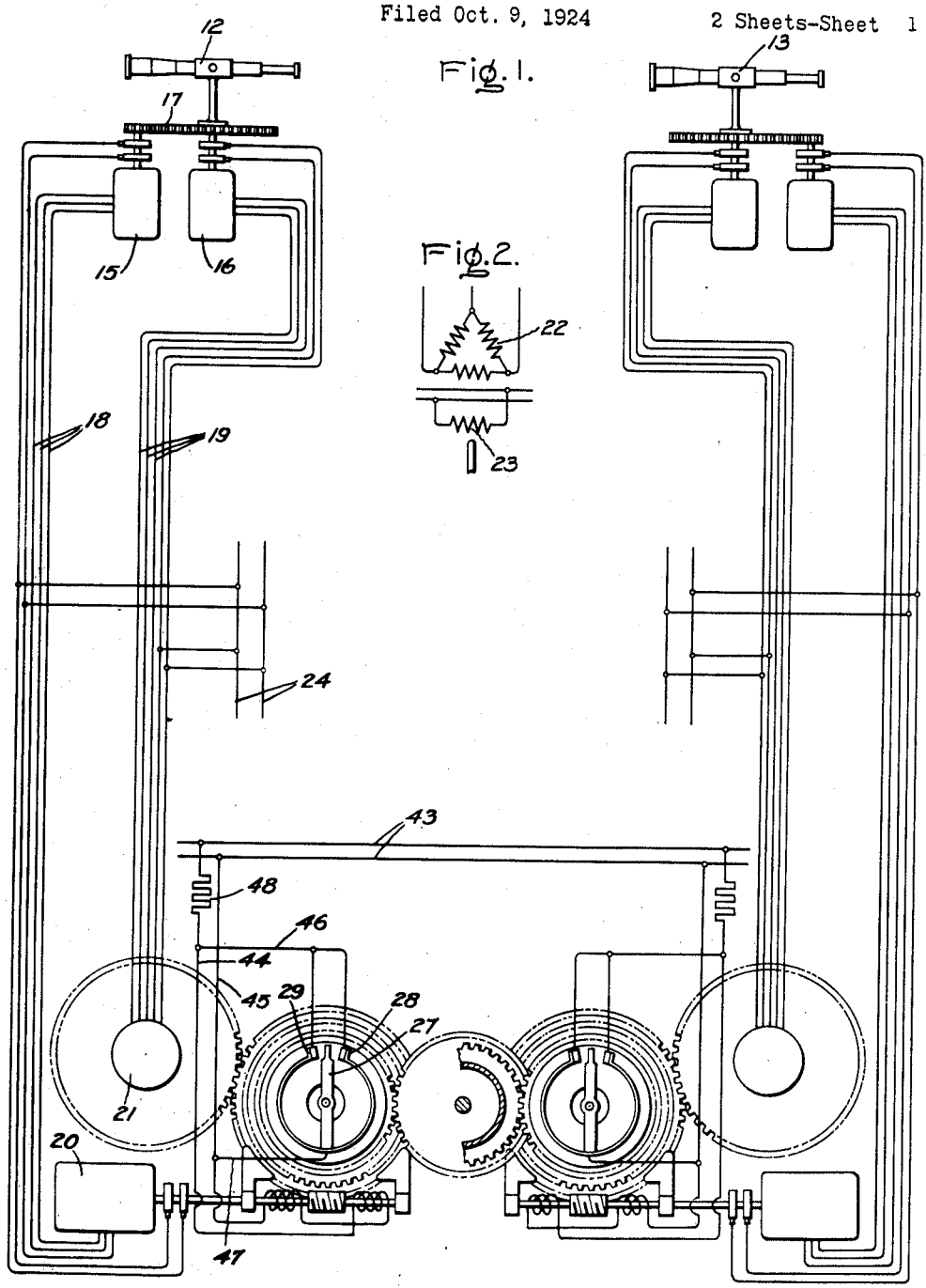
Inventors:
Edwin J. Murphy,
Leonard P. Hutt,
by
Their Attorney.

Inventors:
Edwin J. Murphy,
Leonard P. Hutt,
Their Attorney.

Patented Dec. 4, 1928.

1,694,277

UNITED STATES PATENT OFFICE.

EDWIN J. MURPHY AND LEONARD P. HUTT, OF SCHENECTADY, NEW YORK, ASSIGNORS TO GENERAL ELECTRIC COMPANY, A CORPORATION OF NEW YORK.

MEANS FOR REPRODUCING POSITION.

Application filed October 9, 1924. Serial No. 742,732

Our invention relates to means for reproducing position, and has for its object the provision of a simple and reliable driving connection between two or more reproducers of angular motion operating in different ratios and a single indicator member or other object whereby the object may be driven with great accuracy into angular agreement with the controlling object.

In the driving of remotely situated indicators, and other devices, into angular agreement with a controlling object, such as a telescope, it is necessary where great accuracy is required to use a fine or high speed system for reproducing the motion of the controlling object. This high speed system may operate in a ratio of 72:1. When using the high speed system it is at the same time necessary to use a suitable low speed, such as 1:1 system to avoid errors due to the high speed reproducing getting out of step. This may occur, for example, when the high speed reproducer is switched on the transmitter of a telescope which has a considerably different bearing. Thus with a 72:1 ratio for the high speed reproducer it will be observed that if the reproducer gets out of step 5 degrees of movement of the controlling object it will in fact be a complete revolution out of step and hence will disregard the error. The low speed reproducer is required to prevent such errors.

Where both systems are used, however, for the sake of accuracy, it is difficult to drive a single indicator from both. One expedient is to use the reproducers to control a servo which in turn drives the indicator. The use of a servo motor is of course indispensable when an appreciable force, such as would have a detrimental effect on the accuracy of the reproducers, is required to drive the object. When the driven object is a simple indicator dial or pointer, however, no appreciable torque is required to drive it and it may be driven directly by the reproducers. When both high speed and low speed reproducers are used, suitable driving connections must be provided whereby the object may be driven by the low speed reproducer when necessary within the range of accuracy of the high speed reproducer which then completes the adjustment.

In carrying out our invention we provide a magnetic driving connection between the high speed reproducer and the driven object which connection is controlled by the low speed reproducer so as to disconnect the high speed reproducer when the low speed reproducer is driving the object.

Figure 3:
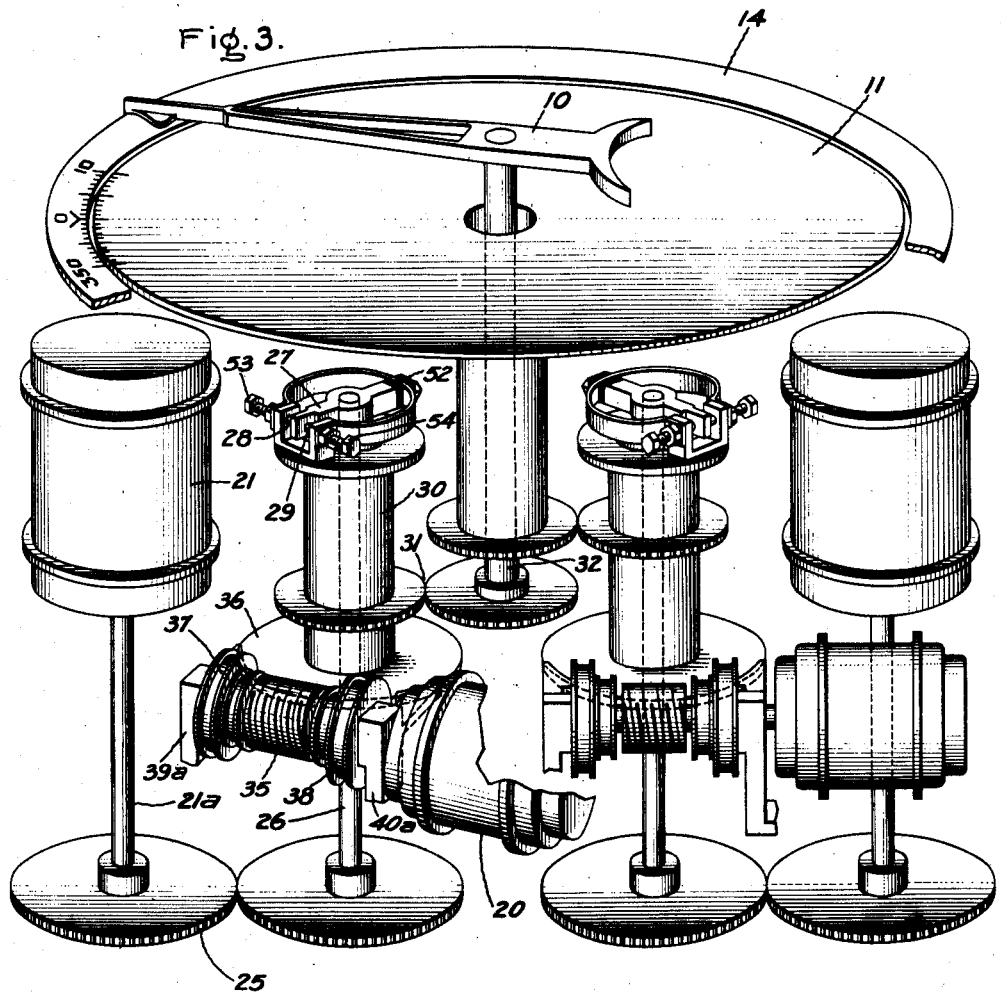
Figure 4:
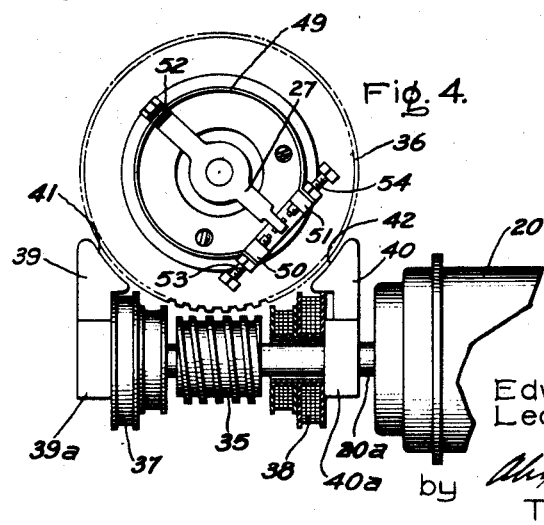

For a more complete understanding of our invention reference should be had to the accompanying drawings in which Fig. 1 shows in diagrammatic form a system for reproducing position embodying my invention; Fig. 2 is a diagrammatic view showing the windings of an instrument used in transmitting angular motion; Fig. 3 is a fragmentary perspective view of the apparatus used; while Fig. 4 is a fragmentary plan view showing details of construction.

Referring to the drawings, we have shown our invention in one form as applied to the driving of a pointer 10 and a dial 11 in synchronism respectively with two remotely situated objects, such as telescopes 12 and 13. As shown, the pointer and dial are mounted to be rotatable about a common axis. Thus any relative angular displacement of the telescopes can be noted by the relation of the dial and pointer. A stationary ring 14 graduated for example in degrees is situated concentrically with the dial.

The pointer and the dial are driven in accordance with angular movements of the telescopes 12 and 13 entirely independently of each other, and the two driving connections between the pointer and dial and the telescopes are similar in construction and operation. Only one driving connection will therefore be described in detail. This connection will be the one between the telescope 12 and the pointer 10.

The pointer 10 is driven in accordance with the angular movements of the telescope 12 in a normally horizontal plane, as shown in the drawing, although obviously the pointer may be driven in like manner to indicate the movements of the telescope in any other plane. Two motion transmitting devices 15 and 16 are driven by the telescope in this plane. The device 16 is direct connected and therefore is driven in a low speed or 1:1 ratio with the telescope while the device 15 is connected to the telescope through gearing 17 to operate at a suitable high speed ratio with the telescope, such as 72:1. The transmitting devices 15 and 16 are electrically connected by means of sets of conductors 18 and 19 to receiving or reproducing devices 20 and 21 adjacent the pointer 10.

The transmitting and reproducing devices 15, 16 and 20, 21 may be of any suitable type. Preferably, however, they are of an alternating current type in which the transmitting and reproducing devices are similar in construction and are each provided with a polycircuit armature winding and a single circuit field winding. As shown in Fig. 2 they may each be provided with a three-circuit armature winding 22 physically similar to a three-phase delta connected armature winding. This armature winding may be mounted on the stator while the field winding 23 is on the rotor. In connecting each reproducing device to its respective transmitting device, three conductors are used by means of which like points of the two armature windings of the devices are interconnected. The field windings are connected to a suitable source of alternating current supply 24.

In the operation of systems of this character for transmitting angular motion, voltages are induced in the polycircuit stator windings of the transmitting and reproducing devices by the field windings on their respective rotors. When the rotors of the connected transmitter and reproducer are in corresponding angular positions with relation to their stators, the voltages induced in the stator windings are equal and opposite and since like points of the windings are connected together no current is set up in the armature windings. If the rotor of the transmitter is turned and held in a new position the voltages then no longer balance whereby equalizing currents are caused to flow in the armature windings, which currents result in a torque applied to the rotor of the reproducer. This torque causes the rotor of the reproducer to turn to a position corresponding to the position of the transmitter rotor. Any movement applied to the transmitter is therefore reproduced with great accuracy by the reproducer.

A mechanical driving connection is provided between the pointer 10 and the coarse reproducer 21. The shaft 21$^a$ (Fig. 3) of this reproducer is connected by 1:1 speed gearing 25 to a counter shaft 26. This counter shaft 26 has secured to it on its upper end a contact arm 27 which moves between two contacts 28 and 29 secured to but insulated from a rotatable sleeve 30. The sleeve 30 is concentric with shaft 26 and is connected by 1:1 speed gearing 31 with the staff 32 of the pointer 10. Thus upon rotation of the shaft 21$^a$ of the reproducer the contact arm 27 is caused to engage with one or the other of contacts 28 and 29 and in this way turn the sleeve 30 and consequently the pointer.

Between the high speed reproducer 20 and the pointer, a releasable electromagnetic driving connection is provided. As shown in Fig. 4 a worm 35 is secured on the shaft 20$^a$ of this reproducer. This worm is mechanically independent of a worm gear 36 secured to sleeve 30 but is in otherwise operative driving relation with the worm gear. In other words, as shown in Fig. 4, the worm 35 is simply displaced in the plane of the worm gear in a direction at right angles to its axis so that the teeth or threads of the worm are spaced from and cannot engage with the teeth of the worm gear. Encircling the shaft 20$^a$ are the two stationary magnet coils 37 and 38 situated adjacent opposite ends of the worm 35. Embracing the two magnet coils are two stationary members 39 and 40 made of magnet core iron. These members 39 and 40 are carried by brackets 39$^a$ and 40$^a$ and preferably encircle the shaft 20$^a$ or at least are situated very close to the shaft. The opposite ends of the members 39 and 40 are provided with slightly curved faces 41 and 42 which are close to the periphery of the worm gear 36.

It will thus be observed that the members 39 and 40 complete a magnetic flux circuit for the coils 37 and 38, this circuit having a common path across the air gap between the worm and worm gear and then dividing and passing in opposite directions along shaft 20$^a$ and through the members 39 and 40 and across the air gaps to the worm gear. Preferably the brackets 39$^a$ and 40$^a$ are made of a suitable material having a low magnetic permeability, such as brass or aluminum, so that the flux is confined to this circuit. Therefore the teeth on adjacent portions of the worm and worm gear form magnet poles of unlike polarity and attract each other. Due to this attraction it is evident that the worm gear 36 will be turned upon rotation of the worm by reproducer 20, the teeth of the worm gear being caused to follow the teeth or threads of the worm by reason of the magnetic attraction between them. It will be observed that the teeth of worm gear 36 will be attracted to a position exactly opposite or abutting the threads of the worm. The driving action is substantially the same as would occur if the worm and worm gear were mechanically engaged, the connection between them, however, being electromagnetic instead of the usual mechanical connection. When the magnet coils 37 and 38 are energized, therefore, the pointer will be turned by rotation of shaft 20$^a$. The driving ratio between the worm gear and worm is 1:72 so that the high speed reproducer 20 drives the pointer in a 1:1 ratio with the telescope.

The two magnet coils 37 and 38 are oppositely connected in series with each other, as indicated in Fig. 1, to a suitable source of electric current supply 43, by means of conductors 44 and 45. For the purpose of controlling the energization of the coils a shunt circuit is provided which is controlled by the contact arm 27. Conductor 44 is connected through a conductor 46 to the two contacts 28 and 29, while the contact arm 27 is connected through a conductor 47 to the conductor 45. Thus when the contact arm engages either of the contacts a shunt circuit is closed around the magnet coils and consequently they are deenergized. When the contact arm does not touch either of the contacts the coils are energized. A resistance 48 is connected in circuit so as to be included when the shunt circuit is closed and thus prevent a short circuit of the supply source 43. The contact arm 27 is biased to a position midway between the two contacts by means of a spring 49. The spring is a resilient strip of metal circular in form and having its ends connected to the posts 50 and 51 carrying the contacts. These posts are insulated from the sleeve 30. The end of the contact arm opposite the contacting end is extended and connected at 52 to the middle of the spring 49, but insulated from the spring.

As thus constructed the operation of our invention is as follows: Any movement of the telescope 12 is repeated by the reproducers 20 and 21 in their respective ratios. Ordinarily the action of the fine reproducer 20 is fast enough to drive the pointer with only a very small lag so that the coarse reproducer does not drive the pointer. When the telescope is swung around with great rapidity or the reproducers switched on to transmitters having considerably different angular positions, the coarse reproducer 21 may first drive the pointer around for a coarse adjustment, the contact arm 27 being then in engagement with one or the other of the contacts 28 and 29 so that the magnet coils are deenergized and the fine reproducer 20 therefore free to turn in its high speed ratio independently of worm gear 36. When the coarse reproducer comes to rest at the end of its movement contact arm 27 will be moved to a position between the stationary contacts by reason of the inertia of the driven parts and also due to the effect of spring 49 whereupon the magnet coils will be energized and the worm gear snapped quickly around through a small angle to accurately position the pointer. The worm gear will come to rest with its teeth exactly opposite the threads or teeth of the worm. The pointer will then be in exact angular agreement with the telescope.

The accuracy of the adjustment given the pointer by the coarse reproducer must serve to turn the worm gear to such a position that when the magnet coils are energized the teeth of the worm gear will be attracted by the proper threads or teeth of the worm. In other words, the maximum possible error with the coarse reproducer must be somewhat less than ½ the pitch of the worm. This can be regulated by adjusting the position of contacts 28 and 29. These contacts are preferably on the ends of screws 53 and 54 which are threaded in the posts 50 and 51.

As previously indicated the operating connection between telescope 13 and the dial 11 is the same as that described between the telescope 12 and the pointer and therefore a detailed description of its construction and operation is not required.

For the purpose of simplicity both the pointer and dial have been shown operated by a telescope. It is contemplated, however, that they may be driven by various objects. For example, when the apparatus is mounted on shipboard, the dial may be driven by a gyro compass. With this arrangement the dial will indicate the compass bearing with relation to the stationary scale 14, and the pointer will indicate the true bearing of the target when compared with the dial, and also the bearing of the target with relation to the ship when compared with the scale 14.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States is:

1. The combination with a driven object, of a plurality of driving means for said object operating at different speeds, driving connections between said driving means and said object, and means including an electric contact device operated by the driving means of lower speed for releasing said driving connection for the driving means of higher speed.

2. The combination with a driven object, of a high and low speed driving means for said object, a driving connection between said low speed driving means and said driven object, means for establishing a driving connection between said high speed driving means and the driven object, electromagnetic means for controlling said means so as to control the driving connection between said high speed driving means and said driven object, and circuit controlling means operated by said low speed driving means for opening the circuit of said electromagnet to release said high speed driving means when the driven object is being actuated by said low speed driving means.

3. The combination with a driven object, of a high and low speed driving means for said object, a driving connection between said low speed driving means and said driven object, a magnetic driving connection between said high speed driving means and said driven object, and means operated by said low speed driving means for releasing said magnetic driving connection.

4. The combination with a controlling object and a driven object, of driving means for for said driven object operating in high and low speed ratios respectively with respect to said controlling object, a driving connection between said low speed driving means and said driven object, an electromagnet for establishing a driving connection between said high speed driving means and said driven object, and circuit controlling means operated by said low speed driving means for opening the circuit of said electromagnet to release said high speed driving means when the driven object is being actuated by said low speed driving means.

5. Means for reproducing position comprising in combination with a controlling object and a driven object, a plurality of driving means for said driving object responsive to movement of said controlling object in high and low speed ratios, operating connections between each of said driving means and said object in their respective ratios, and means operated by said low speed driving means for releasing said operating connection for said high speed driving means when the low speed driving means is actuating said object.

6. Means for reproducing position comprising in combination with a controlling object and a driven object, reproducers of angular motion responsive to angular motion of said controlling object in different ratios, a mechanical driving connection between the low speed reproducer and said driven object, a magnetic driving connection between the high speed reproducer and said driven object, and means operated by said low speed reproducer for releasing said magnetic driving connection when the low speed reproducer is driving said driven object.

7. Means for reproducing position comprising in combination with a controlling object and a driven object, devices for transmitting angular motion driven by said controlling object in high and low speed ratios, reproducers of angular motion electrically connected to said transmitting devices, a mechanical driving connection between said low speed reproducer and the driven object, an electromagnet for establishing a driving connection between said high speed reproducer and the driven object, and circuit controlling means operated by said low speed reproducer for opening the circuit of said electromagnet to release said high speed reproducer when the driven object is being actuated by said low speed reproducer.

8. Means for reproducing position comprising in combination with a controlling object and a driven object, reproducers of angular motion responsive to the movements of said controlling object in high and low speed ratios, a magnet coil for effecting a driving connection between said high speed reproducer and said driven object, and a driving connection between said low speed reproducer and said driven object including means for deenergizing said magnet coil to release said high speed reproducer when the driven object is being actuated by said low speed reproducer.

9. Means for reproducing position comprising in combination with a controlling object and a driven object, reproducers of angular motion responsive to the movements of said controlling object in high and low speed ratios, a magnet coil for producing a magnetic driving connection between the high speed reproducer and said object, a mechanical driving connection between said low speed reproducer and said driven object comprising a contact arm and a pair of contacts between which said contact arm is moved upon rotation of said low speed reproducer to control the circuit of said magnet and release said high speed reproducer when the driven object is being actuated by said low speed reproducer, and resilient means for biasing said contact arm to a position midway between said contacts.

10. Means for reproducing position comprising in combination with a controlling object and a driven object, reproducers of angular motion responsive to the movements of said controlling object in high and low speed ratios, a worm driven by said high speed reproducer, a worm gear having its teeth spaced from said worm connected to said driven object, a magnet coil arranged to include adjacent portions of said worm and worm gear in its magnetic circuit whereby a magnetic driving connection is established between said worm and worm gear, and a mechanical driving connection between said low speed reproducer and the driven object including means for deenergizing said magnet coil to release said high speed reproducer when the driven object is being actuated by said low speed reproducer.

11. Means for reproducing position comprising in combination with a controlling object and a driven object, reproducers of angular motion responsive to the movements of said controlling object in high and low speed ratios, a mechanical driving connection between the low speed reproducer and said driven object, a magnetic connection between the high speed reproducers and said driven object comprising a worm gear and a worm having their teeth spaced apart, a pair of magnet coils encircling the shaft of said worm on opposite ends of said worm, members of magnetic core iron completing the magnetic circuits of said coils through said shaft, worm and worm gear, means for energizing said coils whereby a magnetic driving connection is established between said worm and worm gear, and means operated by said low speed reproducer for controlling the energizing of said coils so as to break the driving connection between said high speed reproducer and said driven object when said driven object is being actuated by said low speed reproducer.

In witness whereof, we have hereunto set our hands this 7th day of October, 1924.

EDWIN J. MURPHY.
LEONARD P. HUTT.